(12) United States Patent
Takahashi et al.

(10) Patent No.: US 8,039,072 B2
(45) Date of Patent: Oct. 18, 2011

(54) GAS TANK AND METHOD FOR PRODUCING THE SAME

(75) Inventors: Naoyuki Takahashi, Toyoaki (JP); Yuichi Watanabe, Kasukabe (JP); Hideki Kikuchi, Matsudo (JP); Takayuki Kawano, Kasukabe (JP)

(73) Assignees: Toyota Jidosha Kabushiki Kaisha, Toyota-shi, Aichi-ken (JP); Somar Corporation, Tokyo (JP)

( * ) Notice: Subject to any disclaimer, the term of this patent is extended or adjusted under 35 U.S.C. 154(b) by 826 days.

(21) Appl. No.: 12/083,377

(22) PCT Filed: Oct. 11, 2006

(86) PCT No.: PCT/JP2006/320690
§ 371 (c)(1),
(2), (4) Date: Apr. 10, 2008

(87) PCT Pub. No.: WO2007/043689
PCT Pub. Date: Apr. 19, 2007

(65) Prior Publication Data
US 2009/0255939 A1    Oct. 15, 2009

(30) Foreign Application Priority Data
Oct. 11, 2005  (JP) .................................. 2005-296409

(51) Int. Cl.
*B29C 70/08*   (2006.01)
*B29C 67/00*   (2006.01)
*B29D 22/00*   (2006.01)
*F17C 1/02*    (2006.01)

(52) U.S. Cl. ..................... 428/36.3; 428/36.4; 428/35.7; 220/586; 264/136; 264/137

(58) Field of Classification Search ................ 428/35.7, 428/36.2, 36.3, 36.8, 36.4; 220/62.22, 562, 220/581, 586, 905
See application file for complete search history.

(56) References Cited

U.S. PATENT DOCUMENTS 5,028,478 A * 7/1991 Odagiri et al. ............... 442/248
5,234,757 A   8/1993 Wong
6,147,142 A   11/2000 Geck et al.
(Continued)

FOREIGN PATENT DOCUMENTS
DE           196 17 379         11/1997
(Continued)

OTHER PUBLICATIONS

Office Action dated Jan. 5, 2010 for DE 11 2006 002 717.4-23.
(Continued)

*Primary Examiner* — Rena Dye
*Assistant Examiner* — Yan Lan
(74) *Attorney, Agent, or Firm* — Finnegan, Henderson, Farabow, Garrett & Dunner LLP

(57) ABSTRACT

According to the present invention, a gas tank having a gas-barrier inner shell and an outer shell that is formed so as to cover the inner shell and is made of a pressure-resistant FRP, such outer shell comprising reinforcing fiber bundles (A), a thermosetting resin (B), and an elastomer particles and/or thermoplastic resin particles (C), provided that elastomer particles and/or thermoplastic resin particles (C) that have been dispersed in a thermosetting resin (B) exist in reinforcing fiber bundles (A), is provided. Such gas tank is excellent in strength and heat resistance and has suppressed gas permeability.

18 Claims, 3 Drawing Sheets

Rubber modification
(Crack prevention)

U.S. PATENT DOCUMENTS

| | | |
|---|---|---|
| 6,190,481 B1 | 2/2001 | Iida et al. |
| 6,429,157 B1 | 8/2002 | Kishi et al. |
| 6,630,221 B1 | 10/2003 | Wong |
| 2002/0088806 A1 | 7/2002 | Takaku et al. |
| 2004/0170554 A1 | 9/2004 | Wadahara et al. |
| 2004/0182869 A1* | 9/2004 | Kubo et al. .................. 220/581 |
| 2004/0206762 A1 | 10/2004 | Iida et al. |

FOREIGN PATENT DOCUMENTS

| | | |
|---|---|---|
| DE | 692 20 841 | 2/1998 |
| DE | 695 30 126 | 12/2003 |
| EP | 0 927 737 | 7/1999 |
| JP | 8-219386 | 8/1996 |
| JP | 8-219393 | 8/1996 |
| JP | 2002-188794 | 7/2002 |
| JP | 2003-83500 | 3/2003 |
| WO | WO-99/02586 | 1/1999 |

OTHER PUBLICATIONS

Office Action dated Jan. 29, 2010 for Canadian Application No. 2,625,342.

* cited by examiner

No modification

Rubber modification
(Crack prevention)

GAS TANK AND METHOD FOR PRODUCING THE SAME

TECHNICAL FIELD

The present invention relates to a variety of gas tanks. In particular, the present invention relates to a gas tank that is suitable for being mounted in automobiles and the like, and a method for producing the same.

BACKGROUND ART

In recent years, gas tanks (gas cylinders) that store hydrogen or natural gas serving as fuel for electric power generation have been used in automobiles, houses, transport machinery, and the like.

For instance, polymer electrolyte fuel cells have been gaining attention as a power source for automobiles. When such fuel cells are used for electric power generation, an electrochemical reaction is induced by supplying a gas fuel (e.g., hydrogen gas) to a gas diffusion electrode layer provided on one side of each fuel cell and supplying an oxidant gas (e.g., air containing oxygen) to a gas diffusion electrode layer provided on the other side. Upon such electric power generation, nontoxic water is exclusively produced. Thus, the above fuel cells have been gaining attention from viewpoints of environmental influences and use efficiency.

In order to continuously supply a gas fuel such as hydrogen gas to an automobile equipped with the above fuel cells, a gas fuel is stored in an in-vehicle gas tank. Examples of in-vehicle hydrogen gas tanks that have been examined include a gas tank that stores compressed hydrogen and a hydrogen-storing gas tank that stores hydrogen in a state of absorption in metal hydride (MH).

Among them, a CFRP (carbon fiber-reinforced plastic) tank has been examined to be used as an in-vehicle gas tank that stores compressed hydrogen. A CFRP tank is structured such that a liner layer (inner shell) that maintains airtight properties of the tank is formed inside a layer (outer shell: fiber-reinforced layer) comprising a carbon fiber-reinforced plastic (CFRP material). Such CFRP tank has strength greater than that of a tank made of a usual type of plastic and is excellent in pressure resistance, so that it is preferably used as a gas fuel tank.

In addition, a known method for producing a CFRP tank involves a technique for producing a CFRP tank by winding a CFRP material in a carbon fiber filament form around a liner layer that is formed in a container form (filament winding method). Since carbon fibers have strength and rigidity in the fiber direction, the strength of a tank can be improved by winding a CFRP material in the manner described above.

Meanwhile, for fuel storage purposes, a pressure-resistant tank is mounted in an automobile for which a liquefied gas such as high-pressure gas (natural gas) or propane is used as fuel. In general, commercially available and widely used pressure-resistant tanks are made of metals such as steel and aluminium. However, metal-made pressure-resistant tanks are thick and heavy. Thus, in addition to poor workability and characteristics that cause danger, great energy is required for transport of such tanks, resulting in an automobile mileage decrease. This is disadvantageous. Further, the calorific value per unit weight of gas fuel is almost half that of gasoline. Thus, in order to extend the distance that a gas automobile can run without fuel supply to an extent comparable to the case of a commercially available gasoline-fueled automobile, it is necessary to supply a gas fuel with a weight greater than that of gasoline, which is problematic.

Thus, in order to achieve weight reduction, a gas tank having an aluminium- or plastic-made inner shell and an outer shell that covers the inner shell and is made of pressure-resistant FRP (fiber-reinforced plastic) has been developed. Such gas tank is essentially made of plastic and thus is much lighter in weight than a metal-made gas tank. Therefore, it is expected that mileage can be improved with the use of the above gas tank as a natural gas tank for automobiles. However, the weight of the outer shell accounts for the most of the weight of a tank. Accordingly, a tank comprising an outer shell having a minimized weight is preferable because such tank is lighter in weight than other tanks. Also, with the use of such tank, in addition to the improvement in mileage, reduction in wear-and-tear expenses for abrasion of tires and brake shoes, laborsaving handling of cylinders, and reduction in accidents can be expected.

However, FRP is more fragile than metals, and thus it might experience generation of cracks and the like when receiving great impact force from the outside. Crack propagation might result in sharp reduction in the pressure resistance and the strength of an FRP-made outer shell. In addition, even when there is slight damage to appearance, cracks and damages in reinforcing fibers are extended due to repetitive application of impact force, which might result in reduction in pressure resistance and strength.

Thus, JP Patent Publication (Kokai) No. 8-219386 A (1996) discloses a gas tank having a gas-barrier inner shell and an outer shell that is formed so as to cover the inner shell and is made of a pressure-resistant FRP, such outer shell comprising reinforcing fiber bundles [A], a hardened material made of a thermosetting resin [B], and an elastomer and/or thermoplastic resin [C], provided that the elastomer and/or thermoplastic resin [C] is localized on the outer circumference of the reinforcing fiber bundle [A] in a cutting section of the outer shell. Such gas tank has been realized in order to impart toughness to the FRP-made outer shell, to maintain the high-pressure resistance, and to suppress propagation of cracks and damages in reinforcing fibers so as to improve impact resistance and fatigue resistance. The gas tank disclosed in JP Patent Publication (Kokai) No. 8-219386 A (1996) is based on technology for realization of a CNG pressure container. According to such technology, the toughness of a matrix resin is improved in a manner such that crack extension in FRP induced by an impact is prevented on the assumption that an impact is applied to FRP and that an impact is repeatedly applied to FRP. As a means of improving toughness, a thermoplastic elastomer is used. The desired strength can be obtained particularly with the use of a polyester or polyamide elastomer among thermoplastic elastomers.

However, in the case of a gas tank disclosed in JP Patent Publication (Kokai) No. 8-219386 A (1996), an elastomer and/or thermoplastic resin [C] is localized on the outer circumferences of reinforcing fiber bundles [A], resulting in the following problems.

(1) Delamination occurs due to poor compatibility between a thermosetting resin serving as a base resin containing a thermoplastic elastomer and fibers. This is because a thermoplastic elastomer is not sufficiently dispersed but is localized in a base resin due to a difference between a thermoplastic resin used as an elastomer and a thermosetting resin used as a base resin, so that stable properties cannot be obtained.

(2) The use of a thermoplastic elastomer results in poor impregnation of fibers with such elastomer upon filament winding (FW) molding of a high-pressure tank. This is because introduction of a thermoplastic elastomer results in increased viscosity of a resin used for FW, leading to poor impregnation of fibers with such elastomer.

(3) Addition of a thermoplastic elastomer results in a decreased glass transition point (Tg) of a CFRP matrix itself. Accordingly, the heat resistance decreases. In addition, the acceptable heat resistance of a tank used as a container is not specifically described. The glass transition temperature of an elastomer component is generally low and thus the heat resistance originally imparted to a base resin cannot be maintained. Further, high-temperature cycle tests are carried out as environmental tests for a container. Thus, it is necessary to describe the acceptable heat resistance of a matrix resin.

(4) Introduction of a thermoplastic elastomer is carried out as a means of preventing fractures such as cracks in a container. Thus, crack prevention in a high-pressure container made of CFRP is not intended to suppress gas permeability by, for example, isolating a gas leaking from a liner.

DISCLOSURE OF THE INVENTION

It is an objective of the present invention to provide a gas tank for a high-pressure gas that is excellent in strength and heat resistance while having a suppressed gas permeability and a method for producing the same. In particular, it is an objective of the present invention to provide a gas tank that has a suppressed hydrogen permeability at a very low level and has passed environmental tests and to provide a method for producing the same.

The present inventors have found that the above objective can be achieved by allowing elastomer particles and/or thermoplastic resin particles (C) that have been dispersed in a thermosetting resin (B) to exist in reinforcing fiber bundles (A) without allowing the elastomer particles and/or thermoplastic resin particles (C) to be localized on the outer circumference of the reinforcing fiber bundle (A). Further, they have found that there are strong correlations between the fracture toughness value of a matrix component and gas permeability and between the fracture toughness value of a matrix component and CFRP bending strength. This has led to the completion of the present invention.

Specifically, in a first aspect, the present invention relates to a gas tank having a gas-barrier inner shell and an outer shell that is formed so as to cover the inner shell and is made of a pressure-resistant FRP. The outer shell comprises reinforcing fiber bundles (A), a thermosetting resin (B), and elastomer particles and/or thermoplastic resin particles (C), provided that elastomer particles and/or thermoplastic resin particles (C) that have been dispersed in a thermosetting resin (B) exist in reinforcing fiber bundles (A). According to the present invention, preferably, elastomer particles and/or thermoplastic resin particles (C) are dispersed in a thermosetting resin (B) such that the resultant has a sea-island structure. With such structure, even after imparting toughness, it is possible to suppress decreases in the heat resistance and the mechanical strength of a thermosetting resin. In addition, in the case of the gas tank of the present invention, elastomer particles and/or thermoplastic resin particles that are uniformly dispersed in an FRP layer absorb or distribute external stress, so that crack generation is prevented and thus toughness is improved, and so that gas permeability through an inner shell is suppressed at an extremely low level.

There are strong correlations between the fracture toughness value of a matrix component and gas permeability and between the fracture toughness value of a matrix component and CFRP bending strength. Specifically, in the case of the gas tank of the present invention, the fracture toughness value of a thermosetting resin composition comprising the thermosetting resin (B) and the elastomer particles and/or thermoplastic resin particles (C) described above is preferably 0.5 $MPa^{0.5}$ to 3.0 $MPa^{0.5}$ and more preferably 0.7 $MPa^{0.5}$ to 1.5 $MPa^{0.5}$. When the fracture toughness value is 0.5 $MPa^{0.5}$ or more, the gas permeability is sufficiently suppressed. When the fracture toughness value is 3.0 $MPa^{0.5}$ or less, the gas tank can pass environmental tests. In addition, environmental tests are described in detail below.

In the case of the gas tank of the present invention, a thermosetting resin composition comprising the thermosetting resin (B) and the elastomer particles and/or thermoplastic resin particles (C) described above contains elastomer particles and/or thermoplastic resin particles (C) in an amount of preferably 0.5 wt % to 10 wt % and more preferably 2.0 wt % to 5.0 wt %. In an amount of 0.5 wt % or more, gas permeability can be sufficiently suppressed. In an amount of 10 wt % or less, the tank can pass environmental tests.

The above elastomer particles (C) are not particularly limited. However, such particles are preferably crosslinked fine elastomer particles. More specifically, the elastomer particles are preferably crosslinked fine nitrile rubber (NBR) particles.

According to the present invention, when the average particle size of each of the elastomer particles and/or thermoplastic resin particles (C) is 0.05 μm (50 nm) to 0.5 μm, the adhesiveness between a resin phase and particles is improved in a thermosetting resin composition comprising the thermosetting resin (B) and the elastomer particles and/or thermoplastic resin particles (C). Such improvement is effective for crack prevention in a thermosetting resin. When the average particle size is less than 0.05 μm (50 nm), the viscosity of a thermosetting resin increases, resulting in poor impregnation of reinforcing fiber bundles. In addition, when the particle size exceeds 0.5 μm, toughness sufficient for reduction in gas permeability cannot be obtained.

A thermosetting resin used for an outer shell of the gas tank of the present invention is not particularly limited. However, a preferred example thereof is bisphenol F type epoxy resin.

In a second aspect, the present invention relates to a method for producing the aforementioned gas tank having a gas-barrier inner shell and an outer shell that is formed so as to cover the inner shell and is made of a pressure-resistant FRP. Such method is characterized in that an outer shell in which elastomer particles and/or thermoplastic resin particles (C) exist in reinforcing fiber bundles (A) is formed around an inner shell, such outer shell being obtained by impregnating reinforcing fiber bundles (A) with a thermosetting resin (B) containing elastomer particles and/or thermoplastic resin particles (C) dispersed therein.

It is possible to add elastomer particles and/or thermoplastic resin particles (C) to either a base resin or a setting agent used for a thermosetting resin (B). However, preferably, the particles are added to a base resin so as to be readily dispersed. It is necessary for elastomer particles and/or thermoplastic resin particles (C) to be uniformly dispersed in a thermosetting resin (B). For dispersion of particles, mechanical kneading is preferably carried out with a roller, a dissolver, or the like. Further, in order to reduce the viscosity, particles are agitated under heating and/or reduced pressure so as to be dispersed.

According to the method for producing a gas tank of the present invention, as described above, the fracture toughness value of a thermosetting resin composition comprising the thermosetting resin (B) and the elastomer particles and/or thermoplastic resin particles (C) described above is preferably 0.5 $MPa^{0.5}$ to 3.0 $MPa^{0.5}$; a thermosetting resin composition comprising the thermosetting resin (B) and the elastomer particles and/or thermoplastic resin particles (C)

described above contains elastomer particles and/or thermoplastic resin particles (C) in an amount of 0.5 wt % to 10 wt %; the elastomer particles (C) are preferably crosslinked fine elastomer particles; the elastomer particles (C) are preferably crosslinked fine nitrile rubber (NBR) particles; the average particle size of each of the elastomer particles and/or thermoplastic resin particles (C) is preferably 0.05 μm (50 nm) to 0.5 μm; and the thermosetting resin (B) is preferably bisphenol F type epoxy resin. In addition, according to the present invention, an outer shell is molded around an inner shell in a manner such that reinforcing fiber bundles (A) are impregnated with a thermosetting resin (B) containing elastomer particles and/or thermoplastic resin particles (C) dispersed therein. Particularly preferably, the outer shell is formed by a filament winding (FW) method.

In a third aspect, the present invention relates to the use of the aforementioned gas tank. Preferred examples of the gas tank include a gas tank to be filled with hydrogen gas, a gas tank to be filled with liquefied natural gas, and a gas tank to be filled with liquefied propane gas.

According to the present invention, regarding gas permeability, which is an important factor for properties of a high-pressure gas tank, the above objective is achieved by imparting toughness to a thermosetting resin used for a CFRP layer. Specifically, an outer shell made of a pressure-resistant FRP is formed with the use of a yarn prepreg obtained by impregnating reinforcing fiber bundles (A) with a thermosetting resin (B) containing elastomer particles and/or thermoplastic resin particles (C) dispersed therein. Consequently, it becomes possible to significantly reduce the amount of permeation of hydrogen, which is important in terms of properties of a container serving as a storage tank filled with, for example, hydrogen fuel for fuel cell vehicles, such hydrogen fuel being compressed at a high pressure. Specifically, fine crack generation in FRP is reduced with the use of elastomer particles and/or thermoplastic resin particles in a thermosetting resin when such tank is deformed by applying gaseous internal pressure or external impacts thereto. Thus, hydrogen permeation through an inner shell (liner) can be suppressed at an extremely low level.

BEST MODE FOR CARRYING OUT THE INVENTION

Figure 1A:
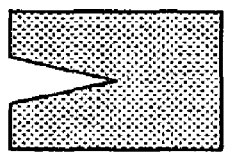
FIGS. 1A and 1B schematically show a crack propagation mechanism in a matrix phase.
Figure 1B:
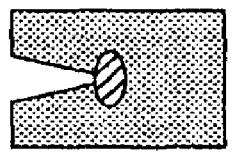

FIGS. 1A and 1B schematically show a crack propagation mechanism in a matrix phase. FIG. 1A shows a conventional thermosetting resin in which elastomer particles and/or thermoplastic resin particles are not dispersed. In this case, cracks generated in the initial period propagate extensively. Meanwhile, FIG. 1B shows the thermosetting resin of the present invention in which elastomer particles and/or thermoplastic resin particles are dispersed. Even after crack generation in the initial period, good adhesiveness between particles of an elastomer or the like and a thermosetting resin phase is maintained. Thus, crack generation is prevented by particles of an elastomer or the like and cracks do not propagate extensively.

For the tank of the present invention, it is possible to use at least one type from among the following examples of high-strength and high-elastic-modulus fiber yarns as reinforced fibers (fibers for CFRP) that exhibit high strength: carbon fiber yarns, graphite fiber yarns, glass fiber yarns, and organic high-elastic-modulus fibers (e.g. polyamide or polyethylene fibers). Among them, carbon fibers are preferably used as a reinforced material for a high-pressure container. Preferably 1,000 to 50,000 carbon fiber filaments and more preferably 10,000 to 30,000 carbon fiber filaments are used.

According to a method for imparting toughness to the tank (high-pressure container) of the present invention to which toughness is to be imparted, elastomer particles and/or thermoplastic resin particles are added and used. Elastomer particles and/or thermoplastic resin particles that have been introduced into a resin for FRP that is used for impregnation can prevent extension of fractures when, for example, crack generation that causes generation of fractures in FRP occurs due to stress generated upon application of internal pressure to a high-pressure container.

Preferably, a resin used for FW has an epoxy resin structure in terms of a suitable design. As a matrix resin constituting FRP used for a high-pressure container, epoxy resin that constitutes a thermosetting plastic is suitable in terms of heat resistance and mechanical strength. According to the present invention, elastomer particles are dispersed in epoxy resin such that toughness is imparted to a hardened material.

The structure of a matrix resin is described in detail below. An FRP-forming resin with which fibers are impregnated refers to an epoxy resin composition comprising, as essential components, epoxy resin, a setting agent, and crosslinked rubber particles serving as a toughness-imparting agent. Preferably, a bisphenol type liquid epoxy resin is used as a base resin of such resin composition. This is because a bisphenol type liquid epoxy resin is well-balanced in terms of adhesiveness to fibers, viscosity, and Tg. It is possible to randomly select such bisphenol type liquid epoxy resin from those that have a liquid form at an average room temperature of 25° C. Particularly preferably, in terms of impregnation in fibers, such resin is a low-viscosity liquid bisphenol F type epoxy resin, but it is not limited thereto. According to the present invention, such liquid bisphenol type epoxy resins can be used alone or in combinations of two or more.

Further, in order to improve Tg, it is possible to use in combination a cycloaliphatic epoxy resin having a liquid form at room temperature in which epoxy groups are condensed into a ring. Examples of a cycloaliphatic epoxy resin having a liquid form at room temperature in which epoxy groups are condensed into a ring include 3,4-epoxycyclohexylmethyl-(3,4-epoxy)cyclohexanecarboxylate, vinylcyclohexene dioxide, bis(3,4-epoxycyclohexylmethyl)adipate, and dicycloaliphatic diester diepoxide.

Furthermore, in order to cause a resin composition to have a low viscosity, it is possible to use in combination an epoxy resin having a low viscosity, which is referred to as a reactive diluent. Examples of such reactive diluent include esters monoglycidyl ethers, diglycidyl ethers, monoglycidyl esters, and diglycidyl esters, which have a liquid form at room temperature.

Specific examples of such reactive diluent include neopentyl glycol diglycidyl ether, 1,6-hexanediol diglycidyl ether, and neodecanoic acid glycidyl ester.

As a setting agent used for a resin composition, a setting agent generally used for epoxy resin can be used. Examples thereof include conventionally known organic compounds comprising functional groups such as carboxylic acid anhydride groups, carboxyl groups, carboxylic acid hydrazide groups, amino groups, hydroxyl groups, and mercapto groups. Specifically, acid anhydride setting agents and amine setting agents are suitably used as setting agents for FW. However, an acid anhydride having in a liquid form at room temperature is most suitably used as a setting agent for the present invention because it can cause a resin composition to have low viscosity. Specific examples thereof include methyltetrahydrophthalic anhydride, methylhexahydrophthalic anhydride, methylnadic anhydride, and methylhimic anhydride.

In addition, an imidazole compound having a liquid form at room temperature is used as a hardening accelerator. Specific examples thereof include 2-ethyl4-methylimidazole and 1-benzyl-2-methylimidazole.

Preferably, epoxy resin is used as a thermosetting resin used for the present invention as described above. In addition to the above examples, examples of epoxy resin, the precursor of which is selected from amines, include a variety of isomers of tetraglycidyl diamino diphenylmethane, triglycidyl-p-aminophenol, triglycidyl-m-aminophenol, and triglycidyl aminocresol. Examples of epoxy resin, the precursor of which is selected from phenols, include bisphenol A type epoxy resin, bisphenol F type epoxy resin, bisphenol S type epoxy resin, phenol novolac type epoxy resin, and cresol novolac type epoxy resin. Examples of epoxy resin, the precursor of which is a compound having a carbon-carbon double bond, include cycloaliphatic epoxy resin. Further, brominated epoxy resin obtained by brominating any of the above epoxy resins can also be used.

Examples of a setting agent for epoxy resin that can be used include acid anhydride (e.g., methylnadic anhydride), amine setting agents (e.g., metaphenylenediamine, methyldianiline, ethylmethylimidazole, and isophoronediamine), polyaminoamide setting agents, phenol setting agents (e.g., bis(parachydroxyphenyl)sulfone), polymercaptan setting agents, and latent setting agents (e.g., dicyandiamide). In addition, a boron trifluorideamine complex referred to as a so-called curing catalyst and an imidazole compound can be used in combination with the above setting agents. In addition, a urea compound obtained via an additional reaction of isocyanate and dimethylamine may be used in combination.

Examples of a thermosetting non-epoxy resin that can be preferably used in the present invention include maleimide resin, a resin having an acetylene terminal, a resin having a nadic anhydride terminal, a resin having a cyanic acid ester terminal, a resin having a vinyl terminal, and a resin having an allyl terminal. These resins may be mixed with epoxy resin or other resins according to need. In addition, a reactive diluent may be used. Also, a modifier such as a thermoplastic resin or an elastomer may be mixed to an extent such that heat resistance is, not significantly lowered. Further, it is also possible to use a thermosetting resin that is widely used in the relevant industries, such as phenol resin, resorcinol resin, unsaturated polyester resin, or vinylester resin.

According to the present invention, it is possible to impart toughness to a resin composition by adding an elastomer component thereto. Preferably, an elastomer component used for the present invention comprises crosslinked fine rubber particles. Preferred examples of crosslinked fine rubber particles to be used include fine particles of rubber such as NBR (nitrile rubber), SBR (styrene rubber), BR (butadiene rubber), emulsion polymerization BR, CR (chloroprene rubber), IIR (butyl rubber), EPDM (ethylene-propylene rubber), CSM (chlorosulfonated rubber), urethane rubber, polysulfide rubber, silicon rubber, or fluorocarbon rubber.

A thermoplastic resin used for the present invention has a bond in a main chain. Typical examples of such bond to be selected include a carbon-carbon bond, an amide bond, an imide bond, an ester bond, an ether bond, a carbonate bond, an urethane bond, a thioether bond, a sulfone bond, an imidazole bond, and a carbonyl bond. It is particularly preferable to use the following examples as the thermoplastic resin of the present invention because they are excellent in impact resistance: polyvinyl acetate; polyamide; polycarbonate; polyacetal; polyphenylene oxide; polyphenylene sulfide; polyarylate; polyester; polyamideimide; polyimide; polyetherimide; polysulfone; polyethersulfone; polyetherether ketone; polyaramide; polybenzimidazole; polyethylene; polypropylene; cellulose acetate; and cellulose butyrate. Among them, polyamide, polyimide, polyamideimide, polyetherimide, polyethersulfone, and polysulfone are particularly preferable for the present invention because they have strong toughness and good heat resistance. In particular, polyamide is most preferable for the present invention because it has particularly excellent toughness.

These elastomer particles and/or thermoplastic resin particles may be used alone or in combinations of two or more. However, it is necessary to select a preferred type of particle in view of dispersibility of a thermosetting resin such as epoxy resin, heat resistance and heat cycle resistance of a hardened material, gas permeability, and the like.

In addition, in view of impregnation of fibers, it is necessary for a thermosetting resin used for FW to have a low viscosity. This is because fibers are unlikely to be impregnated with a thermosetting resin having an excessively high viscosity. Note that when the viscosity is excessively low, a thermosetting resin tends to have a high fluidity and thus the amount of such resin adhering to fibers decreases. Thus, the viscosity of a thermosetting resin at 25° C. is preferably 100 to 1500 mPa·s and more preferably 300 to 800 mPa·s. Further, it is also possible to lower the viscosity by heating upon impregnation in view of pot life.

According to the present invention, one factor that is necessary for evaluation of a gas tank (high-pressure container) is an environmental test (in accordance with a KHK standard). During the test, evaluation is carried out by examining the strength of a high-pressure container upon thermal loading in a weak alkaline immersion solution. Specifically, the method comprises: 1) delivering a pendulum impact to cause damage to a container; 2) immersing the container in an immersion solution (pH=4); 3) carrying out cycle tests 5625 times at room temperature; 4) carrying out cycle tests 2820 times at −40° C.; 5) carrying out cycle tests 2820 times at a pressure of 82°; and 6) delivering a burst pressure ($\geqq$ the maximum loading pressure×180%) to the container.

Heat resistance is required during the tests. Thus, the fracture toughness value corresponding to a property that causes heat resistance reduction is determined to fall within the following range. The fracture toughness value is determined to be 1.5 $MPa^{0.5}$ or less, at which glass transition temperatures (Tg) of 135° C. or higher can be secured. In addition, in the case of nitrile rubber (NBR), the adequate amount thereof is 5 wt % or less. As a result, it is understood that, in an automobile in which it is expected that the gas tank (high-pressure container) of the present invention is used, such high-pressure container does not receive damages even when exposed to an environment similar to that in the above environmental test.

One factor that is necessary for evaluation of a gas tank (high-pressure container) is a gas permeability test (in accordance with a KHK standard). Upon evaluation, a target internal pressure in terms of design is applied to a high-pressure container and then the amount of gas permeating outwards from the inside of the container is measured. The amount of an elastomer that allows a tank to pass the test while heat resistance decrease is appropriately selected and is specified based on the fracture toughness value of a matrix resin. The fracture toughness value at which the amount of permeation of gas of 0.25 Ncc/Lh or less can be secured is determined to be 0.7 $MPa^{0.5}$ or more. In addition, in the case of nitrile rubber (NBR), the adequate amount thereof is 2 wt % or more. As a result, it becomes particularly possible to obtain satisfactory gas permeability by securing strength with the addition of an elastomer.

At least one type of fiber yarn having high strength and high elastic modulus can be used as reinforcing fiber yarn constituting reinforcing fiber bundles used for the present invention. Examples of such fiber yarns include carbon fiber yarns, graphite fiber yarns, glass fiber yarns, and organic high-elastic-modulus fibers (e.g. polyaramide fibers). Such reinforcing fiber yarns are preferably non-twisted fiber yarns that are excellent in terms of fiber opening, thus allowing the degree of concentration of stress due to folding to be reduced and void generation to be reduced. Among such reinforcing fiber yarns, carbon fiber yarns are preferable because they are excellent in relative strength and relative elastic modulus (excellent in terms of weight reducing effects) and do not substantially cause thread breakage or fuzz upon winding. Thus, in addition to the improvement in productivity, deterioration in strength properties and in impact-resistant performance due to incorporation of thread joints or fuzz can be prevented.

Hereafter, Examples for a FC-in-vehicle high-pressure hydrogen tank for which a high-toughness matrix resin is used are described.

[High-Pressure Tank Structure]

A high-pressure container has a gas-barrier inner shell (liner) and a pressure-resistant outer shell that is formed so as to cover the inner shell (FRP layer). Such high-pressure container is mainly composed of a body part, a mirror part following the body, a base boss used for mounting a bulb. The term "FRP" used herein indicates a material obtained by impregnating fibers with a resin and curing the resultant. At least one type of fiber yarn having high strength and high elastic modulus can be used as fiber for FRP. Examples of such fiber yarns include carbon fiber yarns, graphite fiber yarns, glass fiber yarns, and organic high-elastic-modulus fibers (e.g. polyamide or polyethylene fibers). Among them, carbon fibers are preferably used. Preferably, 1,000 to 50,000 carbon fiber filaments, and more preferably, 10,000 to 30,000 carbon fiber filaments are used. Herein 24,000 filaments of fibers having an elastic modulus of around 30 tons were used.

Regarding an FRP-forming resin with which fibers are impregnated, bisphenol F type liquid epoxy resin is used as a base resin used for FW. Elastomer particles that can suppress gas permeability are added to a base resin. A setting agent used was an acid anhydride setting agent.

[High-Pressure Container Molding Method]

As a high-pressure container molding method, a method wherein a tank liner rotates so as to wind fibers was used. Carbon fibers are set on a creel stand in a single direction. Tensile force is applied to the carbon fibers as a result of tank liner rotation and movement of a servomotor contained in the creel stand. The fibers are impregnated with a liquid resin in a layer used for resin impregnation. Next, the resultant is fed through a 4-axis-control FW machine so as to be wound by the rotating tank liner, followed by curing by heating. Accordingly, the tank is finished.

[Properties-1 (Strength)]

Figure 2:
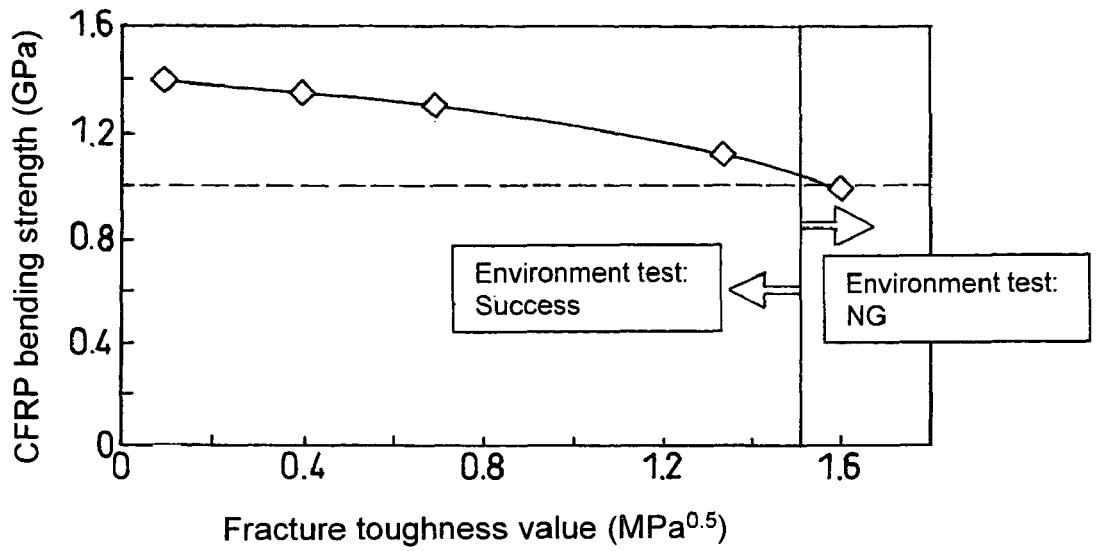
FIG. 2 is a graph indicating environmental test results corresponding to fracture toughness values.

Regarding the above material structure, it is necessary to specify the fracture toughness value of a matrix epoxy resin to which toughness has been imparted in order to secure the reliability of a high-pressure container at high temperatures. The above environmental test is carried out for evaluation of the heat resistance and the chemical resistance of a high-pressure container. FIG. 2 shows environmental test results corresponding to fracture toughness values obtained by using ethylenepropylene rubber (EPDM) particles as elastomer particles.

Based on the results of FIG. 2, the fracture toughness value of a matrix resin to which toughness has been imparted is determined to be 1.5 $MPa^{0.5}$ or less. When a matrix resin is added in an amount greater than that of the above case, the heat resistance/chemical resistance of a high-pressure tank and the fatigue level thereof cannot be satisfactory.

Figure 3:
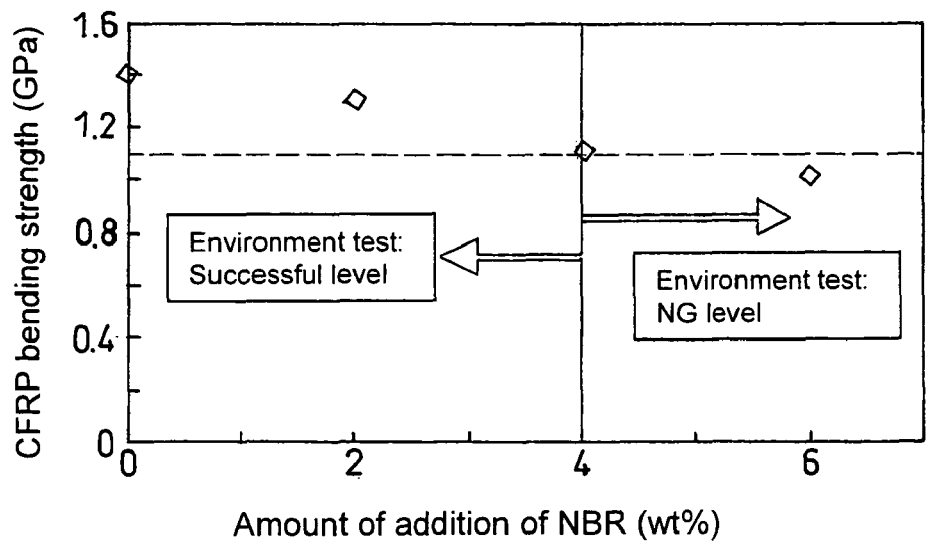
FIG. 3 is a graph indicating environmental test results corresponding to amounts of addition of nitrile rubber (NBR) particles.

In addition, FIG. 3 shows environmental test results corresponding to amounts of addition of nitrile rubber (NBR) particles obtained by using, as elastomer particles, nitrile rubber (NBR) particles having an average particle size of 0.05 μm to 0.5 μm. Based on the results of FIG. 3, the amount of introduction of nitrile rubber particles at which toughness is imparted is determined to be 5 wt % or less. When the particles are added in an amount greater than that of the above case, it is understood that the heat resistance/chemical resistance of a high-pressure tank and the fatigue level thereof cannot be satisfactory.

[Properties-2 (Gas Permeability)]

Figure 4:
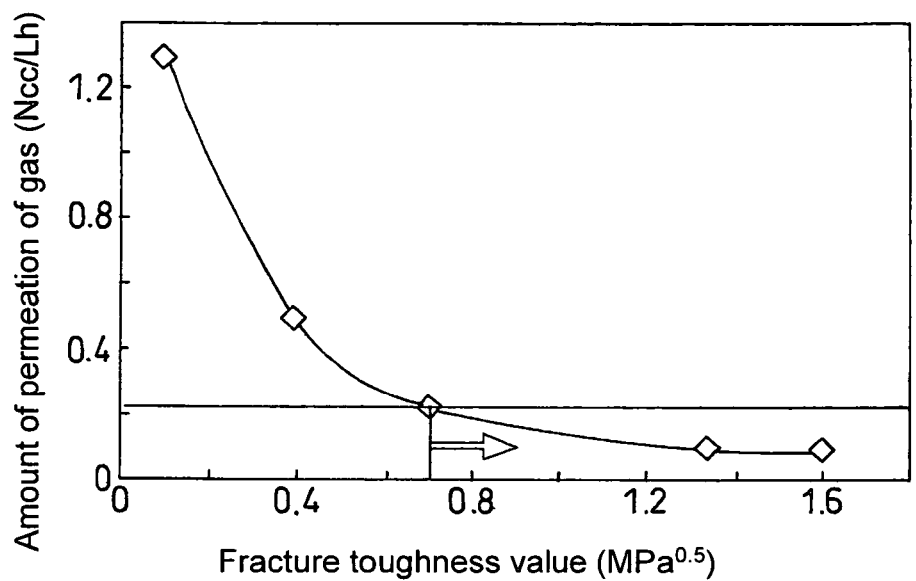
FIG. 4 is a graph indicating gas permeability based on fracture toughness value.

Regarding airtight properties of a high-pressure container, the above high-pressure container liner can substantially secure gas-barrier properties. However, it does not have excellent airtight properties to such an extent that hydrogen is completely blocked. Thus, according to the present invention, an FRP layer is allowed to have gas-barrier properties. Gas permeability can be effectively suppressed with the use of natural rubber to be added to a CFRP matrix resin. FIG. 4 shows gas permeability based on fracture toughness values of ethylenepropylene rubber (EPDM) particles used as elastomer particles.

The following is understood based on the results of FIG. 4.
(1) When the fracture toughness value is low (without the addition of elastomer particles), the amount of permeation of gas cannot be satisfactory.
(2) When the fracture toughness value is 0.7 $MPa^{0.5}$ or more, the amount of permeation of gas through a high-pressure tank can be satisfactory.
(3) The addition of elastomer particles is effective for suppression of gas permeability.

Figure 5:
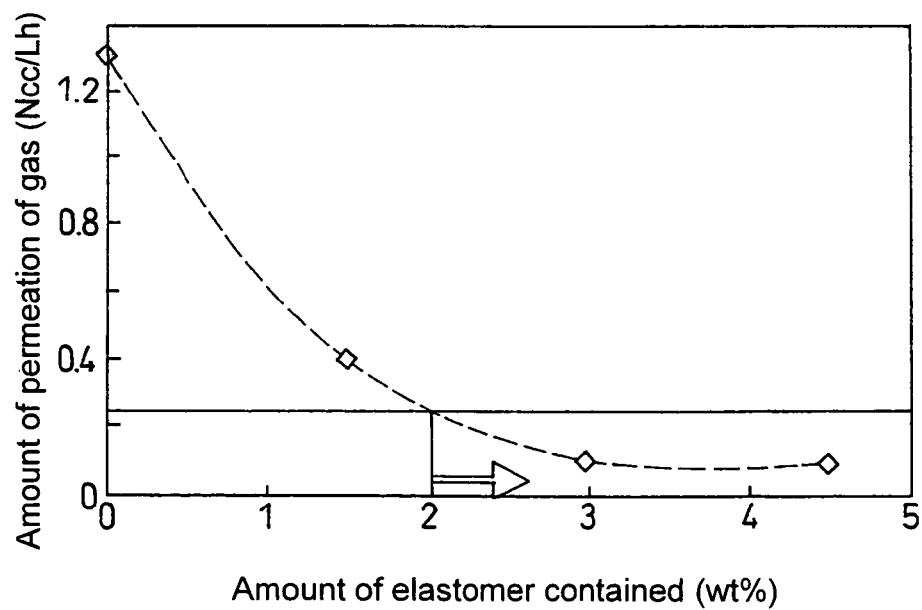
FIG. 5 shows a graph indicating high-pressure tank gas permeability based on the amount of addition of nitrile rubber (NBR) particles.

Further, FIG. 5 shows gas permeability through a high-pressure tank based on the amount of addition of nitrile rubber (NBR) used for elastomer particles. Based on the results of FIG. 5, it is understood that, in addition to (1) and (3), the amount of permeation of gas through a high-pressure tank can be satisfactory with the addition of elastomer particles in an amount of 2 wt % or more (4).

Based on the above results, it is understood that the fracture toughness value of a matrix epoxy resin at which the strength at high temperatures and gas permeability can be satisfactory is preferably 0.7 $MPa^{0.5}$ to 1.5 $MPa^{0.5}$, and that, in such case, the amount of addition of nitrile rubber (NBR) particles is preferably 2 wt % to 5 wt %.

In another Example of the present invention, a resin comprising, for example, a material (elastomer particles) that is excellent in terms of gas-barrier properties is applied to a liner prior to FW molding of fibers in some cases. Accordingly, it becomes possible to minimize gas permeation through a liner prior to prevention of gas permeation through a CFRP layer. In addition, such material can be preliminarily applied with a brush following preparation of a resin. Further, the viscosity of a resin used for impregnation is lowered by diluting it with a solvent such as alcohol, acetone, or MEK, and then the resultant can be uniformly applied on the outer circumference of a liner with the use of an air gun used for spraying or the like. Furthermore, after application of such resin, it is also possible to allow a solvent used for dilution to evaporate upon heating for curing. Thus, such solvent does not influence molded FRP.

INDUSTRIAL APPLICABILITY

According to the present invention, fine crack generation in FRP is reduced with the use of elastomer particles and/or thermoplastic resin particles dispersed in a thermosetting resin when such tank is deformed by applying gaseous internal pressure or external impacts thereto. Thus, hydrogen permeation through an inner shell (liner) can be suppressed such that it is at an extremely low level. Thus, the safety and the utility of a high-pressure gas tank such as a hydrogen tank for a fuel cell vehicle can be improved.

The invention claimed is:

1. A gas tank, comprising:
    an inner shell that is formed as a gas-barrier inner shell; and
    an outer shell that is formed so as to cover the inner shell and is made of a pressure-resistant FRP,
    the outer shell comprising:
        reinforcing fiber bundles (A),
        a thermosetting resin (B), and
        elastomer particles and/or thermoplastic resin particles (C),
    wherein the elastomer particles and/or thermoplastic resin particles (C) are uniformly dispersed in the thermosetting resin (B) and existing in the reinforcing fiber bundles (A).

2. The gas tank according to claim 1, further comprising a thermosetting resin composition comprising the thermosetting resin (B) and the elastomer particles and/or thermoplastic resin particles (C), wherein the fracture toughness value of the thermosetting resin composition is 0.5 MPa m$^{0.5}$ to 3.0 MPa m$^{0.5}$.

3. The gas tank according to claim 1, further comprising a thermosetting resin composition comprising the thermosetting resin (B) and the elastomer particles and/or thermoplastic resin particles (C), wherein the thermosetting resin contains elastomer particles and/or thermoplastic resin particles (C) in an amount of 0.5 wt % to 10 wt %.

4. The gas tank according to claim 1, wherein the elastomer particles (C) are crosslinked elastomer particles.

5. The gas tank according to claim 1, wherein the elastomer particles (C) are crosslinked nitrile rubber (NBR) particles.

6. The gas tank according to claim 1, wherein the average particle size of each of the elastomer particles and/or thermoplastic resin particles (C) is 0.05 μm (50 nm) to 0.5 μm.

7. The gas tank according to claim 1, wherein the thermosetting resin (B) is bisphenol F type epoxy resin.

8. The gas tank according to claim 1, wherein the gas tank is a gas tank to be filled with hydrogen gas.

9. The gas tank according to claim 1, wherein the gas tank is a gas tank to be filled with liquefied natural gas.

10. The gas tank according to claim 1, wherein the gas tank is a gas tank to be filled with liquefied propane gas.

11. A method for producing a gas tank comprising an inner shell that is formed as a gas-barrier inner shell, and an outer shell that is formed so as to cover the inner shell and is made of a pressure-resistant FRP, wherein the outer shell comprises elastomer particles and/or thermoplastic resin particles (C) uniformly dispersed in a thermosetting resin (B) and existing in reinforcing fiber bundles (A) formed around the inner shell, wherein the outer shell is obtained by impregnating the reinforcing fiber bundles (A) with the thermosetting resin (B) containing the elastomer particles and/or thermoplastic resin particles (C) uniformly dispersed therein.

12. The method for producing a gas tank according to claim 11, wherein the gas tank comprises a thermosetting resin composition comprising the thermosetting resin (B) and the elastomer particles and/or thermoplastic resin particles (C), wherein the fracture toughness value of the thermosetting resin composition is 0.5 MPa m$^{0.5}$ to 3.0 MPa m$^{0.5}$.

13. The method for producing a gas tank according to claim 11, wherein the gas tank further comprises a thermosetting resin composition comprising the thermosetting resin (B) and the elastomer particles and/or thermoplastic resin particles (C), and wherein the thermosetting resin contains elastomer particles and/or thermoplastic resin particles (C) in an amount of 0.5 wt % to 10 wt %.

14. The method for producing a gas tank according to claim 11, wherein the elastomer particles (C) are crosslinked fine elastomer particles.

15. The method for producing a gas tank according to claim 11, wherein the elastomer particles (C) are crosslinked fine nitrile rubber (NBR) particles.

16. The method for producing a gas tank according to an claim 11, wherein the average particle size of each of the elastomer particles and/or thermoplastic resin particles (C) is 0.05 μm (50 nm) to 0.5 μm.

17. The method for producing a gas tank according to claim 11, wherein the thermosetting resin (B) is bisphenol F type epoxy resin.

18. The method for producing a gas tank according to claim 11, wherein the outer shell is formed by a filament winding (FW) method.

* * * * *